United States Patent [19]

Morley et al.

[11] 4,421,327
[45] Dec. 20, 1983

[54] HEAVY DUTY END FACE SEAL WITH ASYMMETRICAL CROSS-SECTION

[76] Inventors: James P. Morley, 461 S. Dunton, Arlington Heights, Ill. 60005; Burton K. Olsson, 420 Courtland, Park Ridge, Ill. 60068

[21] Appl. No.: 331,680

[22] Filed: Dec. 17, 1981

[51] Int. Cl.³ ............................................. F16J 15/16
[52] U.S. Cl. ........................................ 277/84; 277/92
[58] Field of Search ....................... 277/84, 88, 90, 92

[56] References Cited

U.S. PATENT DOCUMENTS

| | | | |
|---|---|---|---|
| 3,391,941 | 7/1968 | Donley | 277/90 |
| 3,452,995 | 7/1969 | Engelking | 277/92 |
| 4,176,848 | 12/1979 | Lafuze | 277/92 |
| 4,183,541 | 1/1980 | Wentworth | 277/88 |
| 4,327,921 | 5/1982 | Reinsma et al. | 277/92 |

*Primary Examiner*—Robert I. Smith
*Attorney, Agent, or Firm*—James T. FitzGibbon

[57] ABSTRACT

A mechanical end face seal assembly with first and second, relatively rigid, primary seal rings of a generally T-shaped cross-section and a pair of annular secondary elastomeric seal rings. The secondary rings provide a combination of radial compressive load and axial end face load and are of generally parallelogram shaped cross-section. One secondary seal member extends radially outwardly from its associated primary seal ring and the other secondary ring extends radially inwardly from its associated primary ring.

12 Claims, 10 Drawing Figures

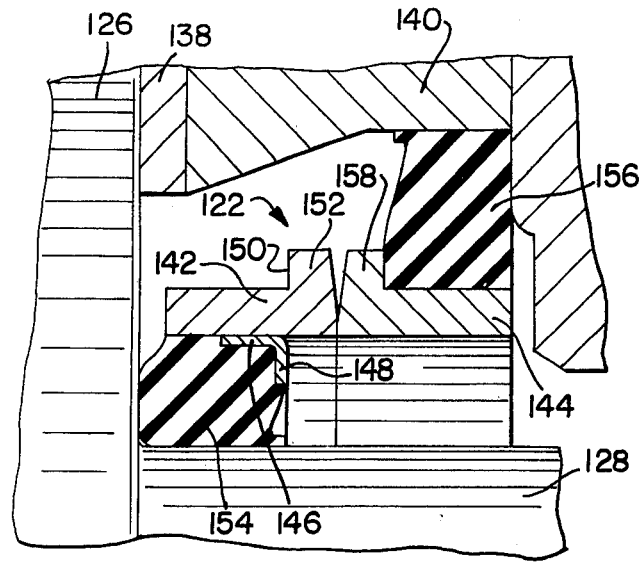
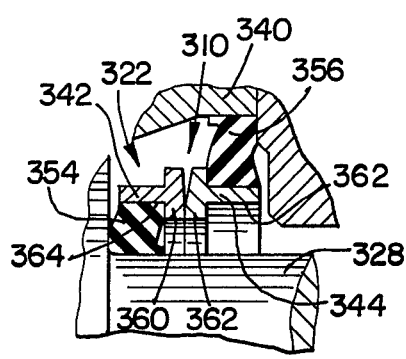
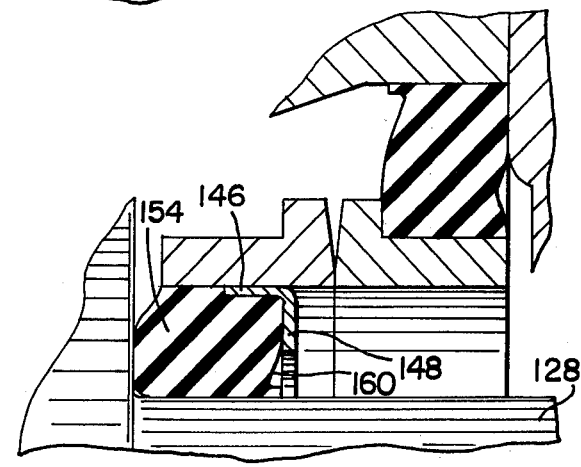
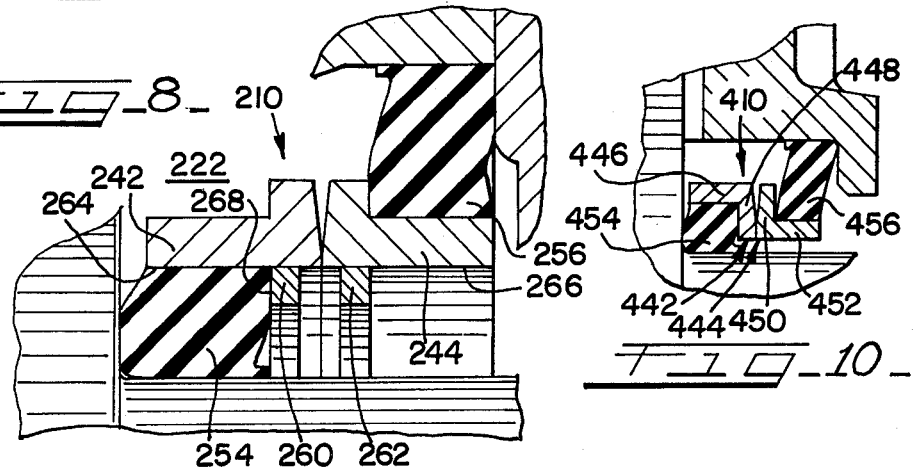

HEAVY DUTY END FACE SEAL WITH ASYMMETRICAL CROSS-SECTION

The present invention relates generally to end face seals, and more particularly to end face seals which are applicable for use in severe service environments, such as in crawler tractor final drives, track rollers, track pins, and the like.

In sealed mechanisms of the types referred to above and elsewhere herein, account must be taken of the severe service environments in which the vehicles and other equipment using the seals operates. Seals, in order to be effective, must operate through a wide range of temperatures and must sometimes operate around the clock for a number of days, and then often sit idle for weeks or months at a time. The types of foreign matter which seals such as those with which the present invention is concerned encountered in use include grit of all kinds, sand, rocks, and organic material, as well as chemically active material such as acidic and basic clays, etc. The sealed mechanism not only undergoes deflection in use because of live and dead loads, but also because of impact loads, as the vehicle is operated over and collides with rocks, concrete formations and the like.

In the prior art, a number of excellent seals have been manufactured, but there is still room for improvement in heavy duty seals, and particularly such improvement can be obtained in a manner which does not require that the customer adopt a specially designed counterbore or other component to use the seal.

A seal which can be fitted to and cooperate with an existing stub axle, end cap and bushing assembly without modification thereof would be desirable as a replacement, and would permit the manufacturer of the equipment to simplify design and manufacturing of suspension components.

In view of the possibility of still further improvement of heavy duty dirt seals, including those adapted to be received in compact installations, it is an object of the present invention to provide an improved heavy duty grit seal.

Another object of the invention is to provide a seal and sealed mechanism of novel configuration.

A still further object of the invention is to provide an exclusion seal which includes a pair of oppositely directed, identical or nearly identical metal members placed in abutting relation and maintained in position by first and second annular secondary seal rings made from an elastomer and having a characteristic shape for the application of desired axial and radial loads.

Another object of the invention is to provide an improved heavy duty grid seal which is adaptable to existing final drives, track rollers, and other applications without modification of the sealed parts.

Yet another object of the invention is to provide a seal in which the balance of forces acting on the sealed mechanism may be controlled in a novel manner.

A still further object of the invention is to provide a seal which develops advantageous operating conditions by reason of using a combination of symmetrical and non-symmetrical metal and elastomeric elements.

Another object of the invention is to provide a seal which has a cross sectional form making it readily adaptable to sealed mechanisms in which the "envelope" or installation area does not permit the use of more conventional seals.

A still further object of the invention is to provide a heavy duty grit seal having a pair of oppositely directed primary seal rings of generally T-shaped configuration and abutting each other along a seal band area, with one such ring being supported by a secondary seal ring of generally parallelogram shaped cross section and extending radially outwardly from an axial flange of the first primary seal ring, and another annular secondary seal ring also having a generally parallelogram shaped cross sectional configuration and extending radially inwardly from the axial flange of the other primary seal ring.

A still further object of the invention is to provide a heavy duty seal having a construction which improves the ability of the seal to accommodate high temperatures generated in use of the seal;

Another object of the invention is to provide one form of seal in which certain components of the primary seal ring may be made from low cost materials while the remainder may be made from high performance, higher cost materials.

Still another object of the invention is to provide a seal which is designed so as to develop minimal thermal distortion in use, that is, so that as the seal tends to distort, it is distorted into a progressively stronger or more favorable contact pattern at the inner diameter of the seal.

Another object is to provide a heavy duty seal which has a metal or like primary seal ring having a cross section which is extremely stiff along a desired axis so as to resist distortion in use and so that existing distortions can be controlled and taken advantage of.

These and other objects and advantages of the invention are achieved in use by providing a heavy duty seal having a pair of primary seal rings, at least one of which is of generally L-shaped or T-shaped configuration, and including axial and radial flange portions with one of such rings being supported in use by an annular elastomeric secondary seal member of generally parallelogram shaped configuration and extending radially and axially outwardly from the outer diameter of the axial flange of its associated primary seal ring, and the other primary seal ring having an annular elastomeric secondary seal member of somewhat similar cross sectional configuration and extending axially and radially inwardly from a radially inner surface of the axial flange of its associated primary seal ring.

The exact manner in which these objects and advantages of the invention are achieved in practice will become more clearly apparent when reference is made to the following detailed description of the various preferred embodiments of the invention set forth by way of examples illustrating the practice of the invention.

BRIEF DESCRIPTION OF THE DRAWINGS

FIG. 6 is a vertical sectional view of a modified form of seal incorporating certain features of the invention and shown installed under full axial load;

FIG. 7 is a view similar to that of FIG. 6 and showing the seal under a reduced axial load;

FIG. 8 is a fragmentary vertical sectional view of a still further modified form of seal made according to the invention;

FIG. 9 is a fragmentary sectional view, on a reduced scale, showing a further modified form of a seal unit made according to the invention; and FIG. 10 is a fragmentary sectional view, on a reduced scale, showing a still further modified form of a seal unit made according to the invention.

DESCRIPTION OF THE PREFERRED EMBODIMENTS OF THE INVENTION

While it will be understood that seals made according to the invention may be applied to a number of different and uses, and, within limits, may be made from different materials, a description of various preferred forms of the seal will be given wherein the sealed mechanism is a portion of a crawler tractor or other piece of heay duty earth moving equipment; where the seals are made from a pair of metal components which engage each other for primary sealing contact and a pair of rubber components which serve plural functions in the seal assembly.

In the following description and in the claims reference is made to radially "inner" and "outer" and to axially "inner" and "outer". While radially "inner" and "outer" are believed to be self-explanatory, by axially "inner" is meant the end of the primary or secondary seal ring lying farthest from or directed away from the seal band area and axially "outer" means lying adjacent or toward the seal band area. Consequently, in position of use, the two "outer" portions of the primary seal rings have surfaces which engage each other and have "inner" ends which are spaced farthest apart from each other.

Figure 1:
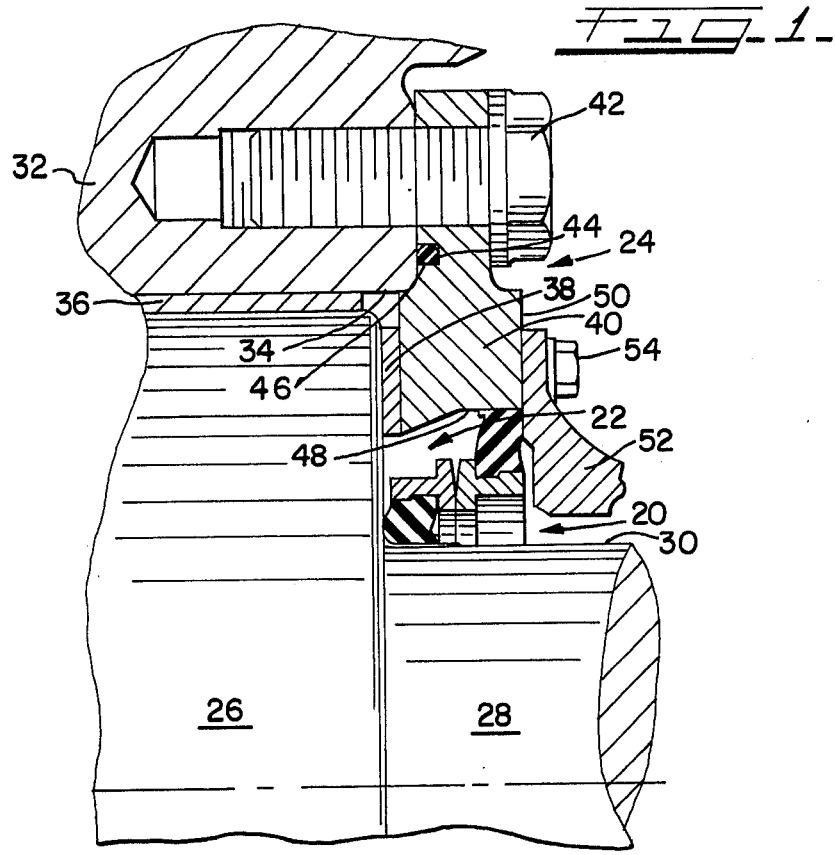
FIG. 1 is a vertical sectional view, with portions broken away, showing the seal of the invention in an installed position of use within a sealed mechanism which includes a shaft with a stub section and an end cap and cover forming a seal receiving cavity.

Referring now to the drawings in greater detail, FIG. 1 shows a seal assembly generally designated 20 and shown to be received within a seal-receiving cavity generally designated 22, in a sealed mechanism generally designated 24. The sealed mechanism 24 includes a large diameter shaft 26 having a reduced diameter end portion 28 with an axially extending, radially outwardly directed exterior surface 30. The shaft 26 is disposed within a support frame member 32 having a cylindrical bore 34 which receives a bushing 36 engaging and supporting the enlarged diameter portion of the shaft 26. A ring type spacer 38 is provided to help position the shaft 26 against end play. A cover ring 40 is secured in place by fasteners 42 over the frame support unit 32, and the cover ring 40 includes a groove 44 receiving an O-ring 46 therein. The cover ring 40 has an inner diameter surface 48 which defines the largest diameter portion of the seal receiving cavity 22, and further includes an axially outwardly directed surface 50 to which a cover plate 52 is fastened, as by a cap screw 54.

Figure 2:
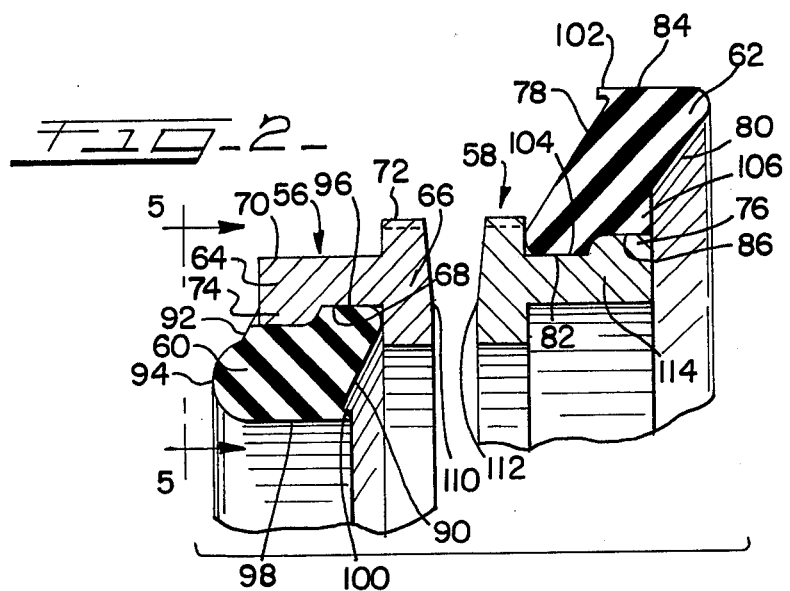
FIG. 2 is a fragmentary vertical sectional view, on an enlarged scale, of the form of seal shown in FIG. 1 and showing the two primary seal ring members axially spaced apart before installation.

Referring now to the seal assembly 20 as a whole, FIG. 2 best shows the unit, which comprises generally left and right hand metal primary seal rings 56, 58, an inner elastomeric annular secondary seal ring 60, and an outer annular elastomeric secondary seal ring 62. It will be understood that, in use, the seal receiving cavity 22 is filled with an oil (not shown) which also serves to lubricate the bushing 36 and the lubricated surfaces of the shaft 26 generally.

Referring again to FIG. 2, additional constructional details of the seal may be seen. As will be noted, the primary seal rings 56, 58 have a similar, but not identical generally T-shaped configuration in the embodiment shown in FIGS. 1-4. The left hand ring 56 has a body portion which includes an axially extending flange 64, and a radially extending flange 66. The axial flange 62 includes a radially inwardly directed inner diameter surface 68 and an oppositely directed outer surface 70. A plurality of teeth or serrations 72 are formed on the outermost portion of the radial flange 66, to which additional reference will be made elsewhere herein. A portion of the inner diameter 68 of the axial flange 64 includes a plurality of inwardly extending, spaced apart driving lugs 74 adapted to cooperate with counterpart recess formations on the secondary ring 60, which recesses are described below.

Referring now to the right hand side of FIG. 2, the generally T-shaped primary right hand seal ring member 58 will be seen to be similar to its counterpart ring 56 except that its drive lugs 76 extend radially outwardly instead of inwardly. Accordingly, a further description of the right hand primary ring 56 is not believed necessary to an understanding of the invention and will be omitted.

Referring now to the construction of the right hand secondary seal ring 62, this unit is also made from an elastomer, and is shown to have generally parallel, axially outer, and inner, inclined sidewalls 78, 80 respectively and radially inner and outer axially extending seating and secondary sealing surfaces 82, 84 respectively, all of such surfaces 78–84 combine to form a secondary seal body 62 which, in its relaxed condition, is of generally parallelogram-cross-sectional shape. The importance of this feature will be referred to elsewhere herein. The seal body 62 further includes a plurality of re-entrants or grooves 86 formed in the heel or axially inner portion of the inner diameter 82 of the secondary seal body 62. These grooves 86 cooperate with and engage the lugs or drive splines 76 for the purpose of increasing the torque transmission capabilities of the seal unit.

Figure 5:
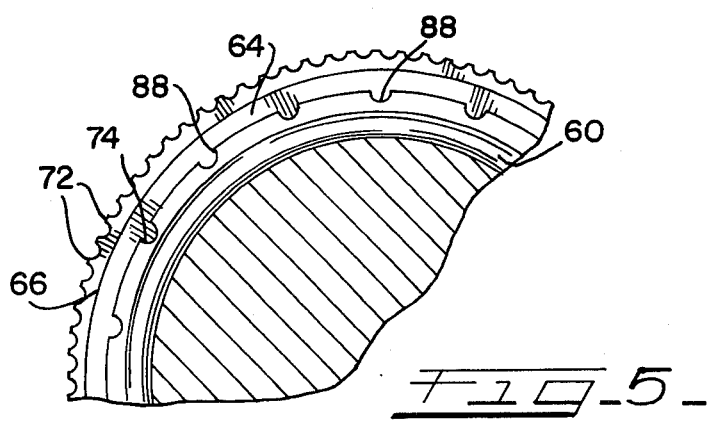
FIG. 5 is a fragmentary end sectional view showing portion of the seal of the invention.

Referring now to FIG. 5, an end view of the seal of FIG. 2 is shown, and it will be seen that the secondary seal body 60 includes a plurality of recesses 88 each of which is adapted to receive therein the lugs 74 formed on the axially inner end of the axial flange 64 of the left hand seal ring 56. FIG. 5 also shows the teeth or serrations 72 located on the outer diameter of the radial flange 66 of the left hand primary seal ring. The lugs 74 and grooves 88 having been illustrated, it will be understood that their counterparts 76, 86, on the right hand side seal parts 58, 62 are of the same or similar construction except that they lie on the outer diameter of the axial flange of the seal ring 56 and on the surface 82.

Referring again to FIG. 2, the left hand secondary seal ring 60 is shown to include axially outer and radially inner inclined, generally frustoconical surfaces 90, 92 as well as a rounded surface 94. Radially outer and inner, generally axially extending surfaces 96, 98 on the secondary seal ring 60 define the remainder of the cross-section of the unit 60 which, in its relaxed condition, is also of generally frusto-conical cross-section, with the inner and outer axial surfaces being axially offset from each other. Both left and right hand secondary seals may include a so-called mounting barb 100, 102 which normally extend radialy towards their associated mounting surfaces in the relaxed condition, and which may be distorted during mounting to the positions shown in FIG. 2. These annular formations 100,102 assist in locating and mounting the seal in proper position within the seal mechanism.

Figure 3:
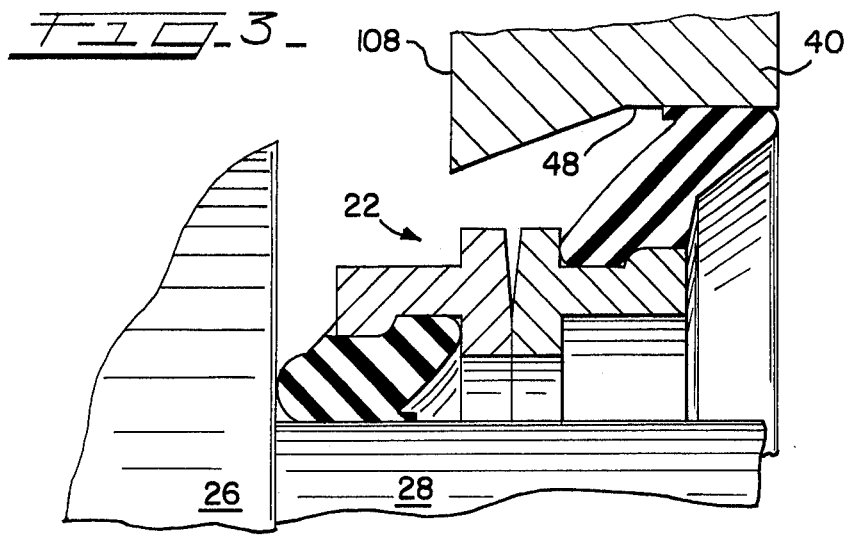
FIG. 3 is an enlarged fragmentary sectional view similar to that of FIG. 2, but further showing the seal in an initial position of installaton within an associated sealed mechanism.
Figure 4:
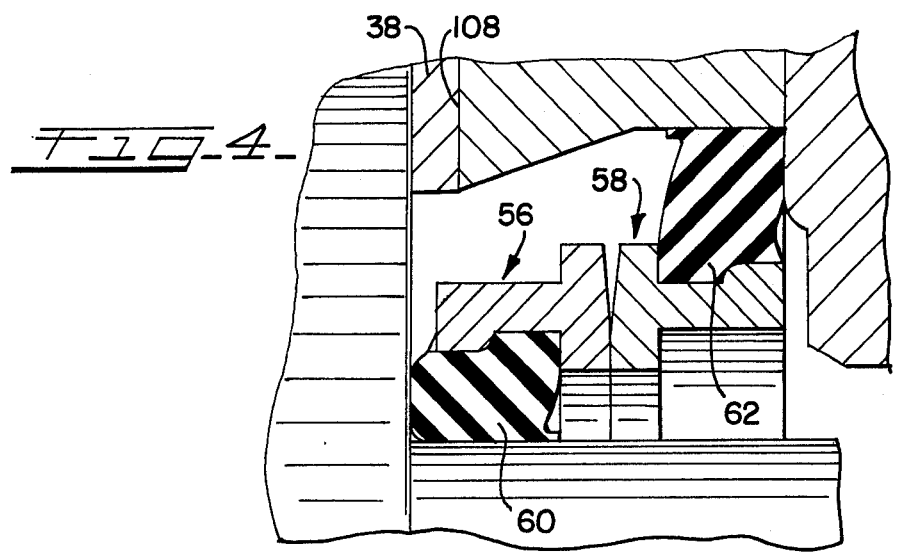
FIG. 4 is a view similar to FIG. 3 but showing the seal in the fully installed and moderately axially compressed position of use.

Referring now to FIGS. 2, 3 and 4, these figures show various steps in the installation of the seal within the intended application.

First, referring to FIG. 2, it is shown that each secondary member is associated with its primary member by primary member before assembly. The outer diameter 96 of the left hand primary ring snugly engages the inner diameter 68 of the ring 56, and the inner diameter 82 of the secondary ring 62 snugly engages the outer diameter 104 of the right hand seal ring 58. The parts are held together by light to moderate frictional engagement, caused by so-called residual interference in molding, that is, by dimensioning the respective diameters the same or with an interference fit a few thousandths of an inch.

FIG. 2 shows that, in the relaxed position, the secondary seal members are of generally parallelogram-shaped cross-section, it being understood that the mounting portions 100, 102, the bulged surface 94 and the bevel or heel formation 106 are only slight modifications to the general shape referred to.

However, as referred to herein, and in the claims, the expression "generally parallelogram-shaped cross-section" means not only seals of true parallelogram cross-sectional shape but includes those of the type illustrated and others which possess the operational features of this shape. By the foregoing is meant the ability of an annular rubber member of this sort, when associated with appropriately sized inner and outer diameters, and then moved axially to a more planar or more "upright" position, to deform elastically so as to maintain an axial load acting to restore this member to its upright position, and at the same time develop an increased radial compressive load on both its inner and outer diameters. Application of such loads not only serves to distort the secondary ring into a more planar or upright configuration, but also causes the inclined, radially extending surface such as the pairs of surfaces 78, 80 and 90, 92 to bulge outwardly or toward somewhat spherical shape.

It is a characteristic of this shape that a carefully regulated load may be applied to the seal and that desirable spring action can be obtained from the rubber member. The rubber permits the seal to deflect under axial load; permits both primary and secondary sealing forces to increase as an increased load is applied, increases secondary sealing forces and torque transmission characteristics as the load increases and still prevents build-up of a load which would cause excessively high friction and premature wear.

Referring now to FIG. 3, a seal assembly of the type shown in FIG. 2 is pictured as being in the initially installed position within a seal cavity 22, which in turn is formed between portions of a shaft 26, its necked down portion 28 and the cover ring 40 containing the inwardly directed mounting surface 48. Here, it is shown that left and right hand seal ring pairs have been positioned with their associated parts, but that the parts have not been moved into a completely assembled position.

FIG. 4 shows that an end face 108 of the cover ring 40 has been moved into engagement with the spacer 38. This condition is known as the minimum "installed height", that is, the installed condition at which the seal ring members are most strongly urged toward each other. In use, the secondary seal rings will flex between positions such as those shown in FIG. 4 and positions wherein the secondary members 60, 62 are considerably more, but not totally, relaxed. This dynamic movement is caused by end play between moving parts, including the surface 108 and the part 38.

Referring again to FIG. 2, a pair of opposed surfaces 110, 112 are shown to comprise the axially outer end faces of the seal rings 56, 58.

The exact point at which these surfaces meet to form a dynamic axial seal is referred to as the seal band area. This area is formed, as is well known to those skilled in the art, by a fine grinding, honing or lapping process. An important feature of the present invention is that this surface is formed so as not to lie radially outwardly of the respective outer diameters of the axial flanges 64,114 of the rings 56, 58. Consequently, significant portions of the surfaces 110, 112 are spaced apart from each other near the radially outer portions thereof while the initial contact is preferably made at or near their inner diameters. As the seals wear in use, the seal band may move somewhat, but it will normally lie between the innermost diameter of the radial flanges and the points opposite the approximate middle of the axial flanges.

In prior art seals, the seal band was formed at or relatively near the outer diameter of the radial flange and, in use, worked its way somewhat inwardly thereof. In seals made according to the present invention, the seal band, lies at or near the inner diameter. This is also important because the grit being sealed agaisnt is present in these inner diameters and the lubricated portion of the seal lies on the outside diameter of the seal.

Referring now to FIG. 6, a modified form of seal made according to the invention is shown to be installed in a seal cavity 122. This installation includes a shaft 126 with a reduced diameter portion 128, a spacer 138, a cover plate 140, and left and right hand primary seal rings 142, 144. The rings 142, 144 as made are identical to each other, but the left hand ring 142 further includes an auxiliary annular secondary seal-receiving and positioning ring 146 of L-shaped cross-section. As illustrated, this ring may be made from sheet metal or the like.

Its radial flange 148 is arranged so that the axially inner, radial surface of this flange 148 is axially aligned with or somewhat inwardly of its counterpart surface 150 on the radial flange 152 of the ring 142. The secondary seal rings 154, 156 are the same or similar to their counterparts in FIGS. 1-4, and the other principal differences are only that the radial flanges 152, 158 of the rings 142, 144 do not themselves extend radially inwardly of the inner diameters of the axial flanges forming the seal rings 142, 144.

Seals made as illustrated operate in the same manner as those shown in FIGS. 1-4; they are somewhat less expensive to manufacture, but may have a shortened life expectancy. From the manufacturing standpoint, both rings 142 and 144 are identical and this reduces the number of parts required to be made and inventoried by the manufacturer. This form of seal uses less material, which may be important where the rings 142, 144 are made from expensive alloys.

FIG. 7 shows the seal of FIG. 6 in an installed, but less, fully compressed position. In this illustration, the axially outer surface 160 of the rubber member 154 is shown as being spaced axially apart from the flange 148, rather than having its leading edges overlap it somewhat as shown in FIG. 6.

FIG. 8 shows another form of seal made according to the invention and shows a seal cavity generally designated 222, occupied by a seal assembly 210, and shows the assembly 210 to include left and right hand primary seal rings 242, 244 and secondary seal rings 254, 256 which are similar or identical to their earlier-described counterparts shown in FIGS. 1-7. The only important different between the embodiment of FIG. 8 and that of FIG. 7 is that left and right hand auxiliary rings 260, 262 are rectangular in cross-section and are shown to be affixed to the radially inner, axially extending surfaces 264, 266 of the rings 242, 244. The left hand ring 260 serves in the same manner as its counterpart 146 in FIGS. 6 and 7 to locate the secondary seal ring 254; that is, it is axially inner, radially extending surface 268 cooperates with the surface 264 to form a seal for the toe portion of the secondary ring 254.

When a seal is constructed as shown in FIG. 8, both the primary and secondary seal rings are identical. Thus, whereas in FIGS. 6 and 7, no ring 146 is provided for the right hand seal ring 144, because the secondary ring 156 lies outside its associated primary ring, such a ring 262 is present in the embodiment of FIG. 8. This may be desired because it makes the parts interchangeable, but more commonly, the auxiliary ring 262 is provided so that the primary ring structure as a whole comprise identical pieces for purposes of symmetry. Thus, each piece is subject to the identical physical loads and each will have identical mechanical and thermal properties. In practice, the auxiliary rings 260, 262 are made from mild steel which may be pressed or bonded in place; other rigid materials are also suitable, but it is preferred to make these rings from a more economical material. For severe applications, the rings 264, 266 are made from a hard but expensive alloy such as a cobalt-chrome-nickel alloy, such as a "Haynes 93" or "stellite" material.

Referring to FIG. 9, another form of seal is shown. This unit is identical to its counterparts in FIGS. 1-5, except that no drive lugs are provided. Thus, this form of seal includes left and right hand primary seal rings 342, 344, left and right hand secondary rings 354, 356, comprising a seal assembly 310 located in the seal cavity 322, and situated relative to a shaft part 328, a cover ring 340, and other associated parts.

In the embodiment of FIG. 9, the primary rings 342, 344 are of generally T-shaped cross-section, and radial flanges include heel portions 360, 362 which extend well inward radially of the radially inner axially extending surfaces 364, 366 of the left and right hand primary seal ring bodies. FIG. 9 shows that primary sealing contact is made, and the seal band area lies, well toward the innermost diameter of the rings 342, 344. The advantage of the construction of FIG. 9 is that both primary rings are identical to each other for purposes of simplifying manufacturing and reducing part numbers and inventory requirements.

The units are identical and consequently awill have identical mechanical and thermal properties, a consideration which is important as the seals encounter heavy duty, continuous use.

FIG. 10 shows a form of a seal similar to the form shown in FIGS. 1-9, except that the seal assembly 410 includes primary seal rings 442 and 444 which are of L-shaped configuration, and inverted with respect to each other. Thus, the ring 442 has axial flanges 446 and a radial flange 448, and the ring 444 has radial and axial flanges 450, 452.

Except for their diameters, the secondary seal rings 454, 456 are the same or their other counterparts herein described. The seal band area lies at or inwardly of the outer diameter of the axial flange 452.

An important feature of the invention is that, unlike certain prior art counterpart seals, such as the seals shown in U.S. Pat. No. 3,241,843, the seals of the present invention provide for retaining oil on the outside diameter of the seal, and for excluding grit from entering at the inside diameter of the seal. In many prior art seals, the cavities, etc. were not suitable for this application. However, with the seal of the present invention, hollow shaft mechanisms, structures used in rock drilling bits, and other difficult-to-seal applications, particularly those where grit is present on the inside diameter of the seal, may be sealed satisfactorily.

While this has some advantages as far as the operational characteristics of the seal are concerned, it has very great advantages where the manufacture of the machine components themselves are concerned. Thus, significant economies of design may be achieved in the seal mechanism such as a seal mechanism of the type shown in FIG. 1, by reference to which it can be appreciated that oil lies in the sealed region 22, where its circulation can be aided by the provision of the teeth or serrations 72. Such oil also lubricates the seal band, the bushing 36 and the roller 26.

Another advantage of the present invention is that, in use, a minimal amount of harmful thermal distortion is present in use. When thermal and mechanical loads are applied, the seal band areas on the two radial flanges of the primary seal rings tend to be moved more closely together, and a strong sealing force is applied where it is most needed. In some prior art designs, it is thought that seals distorted towards a less tightly sealed position when subjected to mechanical or thermal stresses.

The present invention provides an improved seal having the ability to seal grit located on its inside diameter, and is therefore advantageous for many sealed mechanisms, particularly those subjected to severe environments.

It will thus be seen that the present invention provides a novel seal unit having a number of advantages and characteristics, including those pointed out above and others which are inherent in the invention. Several preferred embodiments of the invention having been described by way of example, it is anticipated that changes and modifications of the described seal units will occur to those skilled in the art, and that such changes and modifications may be made without departing from the spirit of the invention or the scope of the appended claims.

I claim:

1. A mechanical end face seal assembly comprising, in combination, first and second, relatively rigid, generally annular, primary seal rings, each adapted to cooperate with an associated secondary seal ring to form said mechanical end face seal assembly, each of said primary rings having a body portion which comprises an axially extending flange and a radially extending flange, said flanges being arranged so that said body portion has a generally T-shaped cross-section, with said radial flange having an outer end face surface and a pair of inner end face surfaces, said inner end face surfaces being spaced radially apart from each other, said axial flange having an outer, axially extending, radially outwardly directed surface and an inner, axially extending, radially inwardly directed surface lying parallel to and spaced apart from said outer surface, said outer end face of said radially extending flange on said first primary ring having an exterior portion thereof finished so as to cooperate with an oppositely directed, counterpart surface on said second primary ring to form a primary seal band area, one of said axially extending surfaces on each of said second primary rings cooperating with one of said inner end face surfaces to form a seat defind by substantially perpendicularly related surfaces and being adapted to receive and position therein a portion of a secondary seal ring, and a pair of secondary elastomeric seal rings, each being annular and having a body portion adapted to provide, in use, a combination of radial compressive load and axial end face load to said seal assembly, each of said secondary rings having generally cylindrical, spaced apart, inner and outer diameter surfaces adapted to cooperate respectively with one of said inner and outer axially extending surfaces on said primary seal ring and an associated machine part, said inner and outer surfaces being, in the relaxed condition of said secondary rings, axially offset from each other, said secondary seal bodies further including axially inner and outer surfaces having inclined portions joined at their ends to said cylindrical surface portions so that at least portions of said seal bodies are of generally parallelogram shaped cross-section, said first and second primary rings and the first and second of said pair of secondary rings being constructed and arranged respectively for association with each other such that said seal bands abut each other and so that one of said secondary seal members extends outwardly from the radially outer axial surface of said primary seal ring and so the other secondary ring extends radially inwardly from the radially inner axial surface of said primary ring, with portions of each of said outer inclined surfaces of said secondary rings being adapted, under load, to engage one of said inner axial surface on its associated primary ring for application of said end face load to said primary seal ring.

2. An end face seal as defined in claim 1 wherein said first and second primary rings are identical to each other.

3. An end face seal as defined in claim 1 wherein one of said secondary rings, in the relaxed condition thereof, has a greater radial dimension and a smaller axial dimension than the other of said elastomeric secondary rings.

4. An end face seal as defined in claim 1 wherein said primary and secondary rings further include cooperative interlocking surfaces located respectively along the portions of the secondary seals which engage said axially extending surfaces of the primary seal ring, and on said axially extending surfaces of said primary seal rings, said interlocking surfaces providing for increased torque transmission between said primary and secondary seal rings.

5. An end face seal as defined in claim 1 wherein said radially extending flange of said primary seal body portion comprises a portion extending radially outwardly from said axial flange, said radially outwardly extending flange being formed integrally with said axially extending flange and wherein said radially inwardly extending flange comprises a ring of another rigid material, secured to and extending radially inwardly from said radially inner, axially extending surface of said body portion.

6. An end face seal as defined in claim 1 wherein vanes are provided on the radially outermost portions of said primary seal ring axial flanges to engage and circulate lubricant provided for said sealed mechanisms.

7. An end face seal as defined in claim 1, wherein said first and second primary seal rings are identical to each other.

8. An end face seal as defined in claim 1 wherein said primary seal band area, in use, is formed in an area lying radially between said radially inner and outer, axially extending surfaces on said primary seal rings.

9. A mechanical end face seal assembly comprising, in combination, first and second annular primary seal rings each having a body of T-shaped cross-section, the first of said rings having axial and radial surfaces meeting to define a radially inwardly directed seat for receiving a secondary seal ring, a first elastomeric secondary seal ring associated with said first primary ring and having an annular body with a generally parallelogram-shaped cross-section in its relaxed condition and having an axial surface sized to be seated snugly along said axial surface of said first primary ring, and an inclined but generally radially extending surface adapted in its relaxed condition to have a portion spaced apart from said radial flange on said first primary ring and to be urged toward and against a porton of said radial flange under load, said second primary seal ring having a radially outwardly directed seat for receiving an associated secondary seal ring, a second secondary seal ring associated with said second primary ring and having an annular body with a generally parallelogram-shaped cross-section in its relaxed condition and having an axial surface sized to be seated snugly along said axial surface of said primary ring, and an inclined but generally radially extending surface adapted in its relaxed condition to have a portion spaced apart from said radial flange on said primary ring and to be urged toward and against a portion of said radial flange under load, said first and second primary rings each having a seal band area on an axially outer surface of said radial flange, said seal band area being located between the radially central and the radially innermost portions of said radial flange surfaces.

10. A mechanical end face seal as defined in claim 9, wherein one of said radial flanges forming said T-shaped body is in the form of an auxiliary ring situated on the inside diameter of said primary seal ring, said auxiliary ring having a generally rectangular cross-section.

11. A mechanical end face seal as defined in claim 9, wherein one of said radial flanges forming said T-shaped body is in the form of an auxiliary ring situated on the inside diameter of said primary seal ring, said auxiliary ring having a generally L-shaped cross-section.

12. A mechanical end face seal assembly comprising, in combination, first and second annular primary seal rings each having a body of L-shaped cross-section, the first of said rings having axial and radial surfaces meeting to define a radially inwardly directed seat for receiving a secondary seal ring, a first elastomeric secondary seal ring associated with said first primary ring and having an annular body with a generally parallelogram-shaped cross-section in its relaxed condition and having an axial surface sized to be seated snugly along said axial surface of said first primary ring, and an inclined but generally radially extending surface adapted in its relaxed condition to have a portion spaced apart from said radial flange of said first primary ring and to be urged toward and against a portion of said radial flange under load, said second primary seal ring having a radially outwardly directed seat for receiving an associated secondary seal ring, a second secondary seal ring associated with said second primary ring and having an annular body with a generally parallelogram-shaped cross-section in its relaxed condition and having an axial surface sized to be seated snugly along said axial surface of said primary ring, and an inclined but generally radially extending surface adapted in its relaxed condition to have a portion spaced apart from said radial flange on said primary ring and to be urged toward and against a portion of said radial flange under load, said first and second primary rings each having a seal band area on an axially outer surface of said radial flange, said seal band areas being located adjacent the inner diameter of said primary rings, and engaging each other in use to form a primary seal band.

* * * * *